Patented Sept. 17, 1929

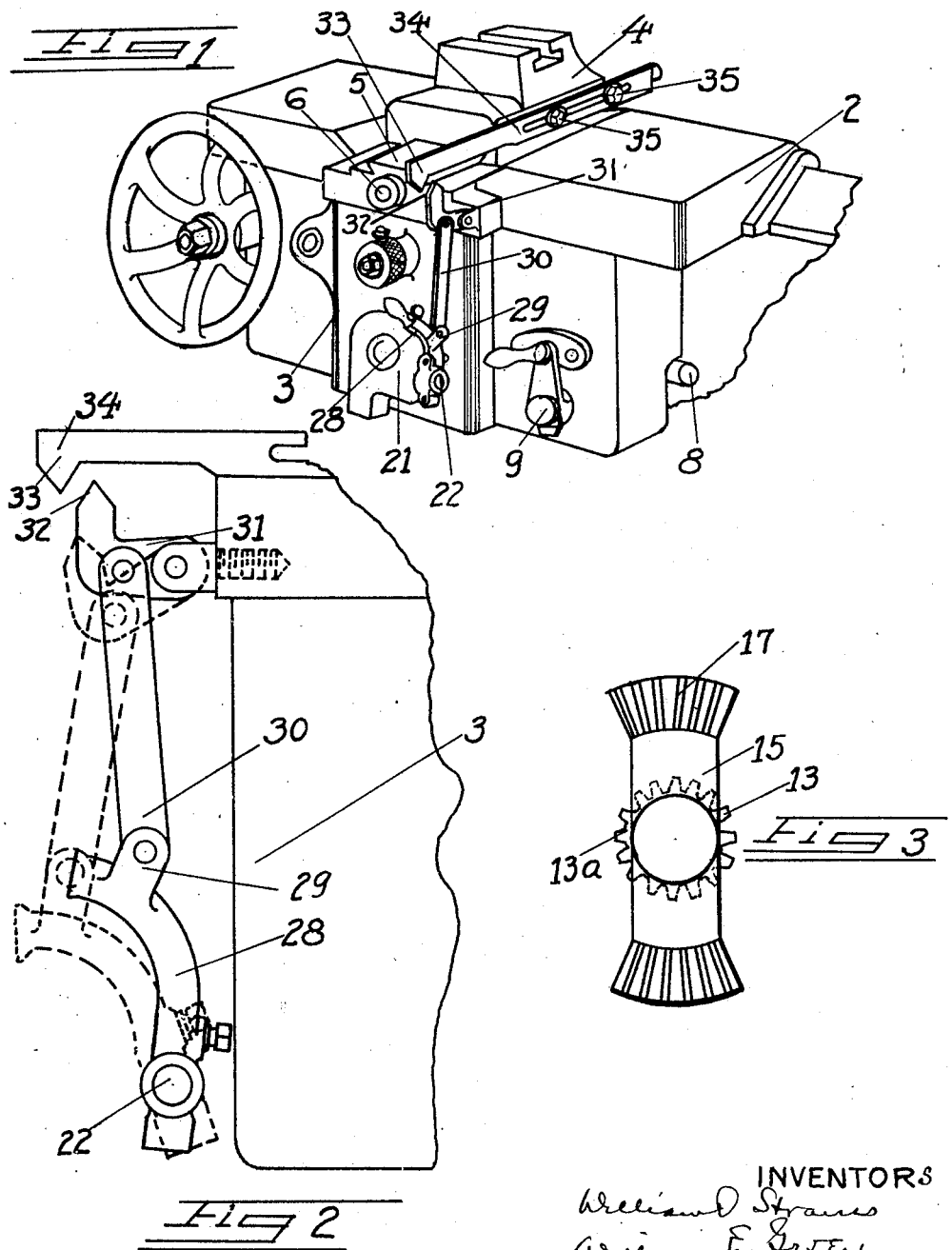

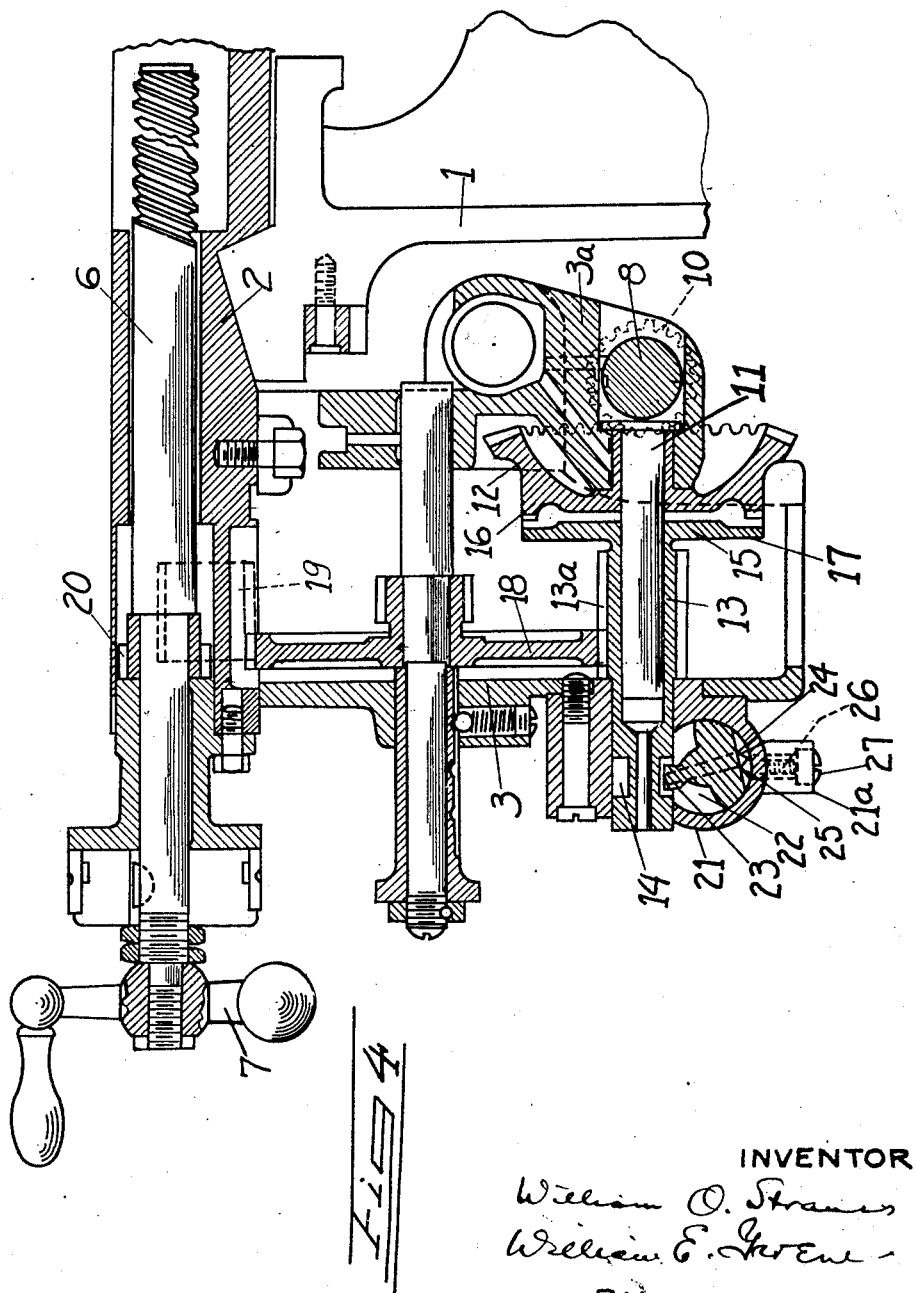

1,728,220

UNITED STATES PATENT OFFICE

WILLIAM O. STRAUSS AND WILLIAM E. GROENE, OF CINCINNATI, OHIO, ASSIGNORS TO THE R. K. LE BLOND MACHINE TOOL COMPANY, OF CINCINNATI, OHIO, A CORPORATION OF DELAWARE

LATHE CROSS FEED

Application filed June 22, 1925. Serial No. 38,677.

Our invention relates to cross feeds for lathes, and more particularly to modes of automatically controlling the cross feed, as by an adjustable stop, which throws off the operating means.

It is our object to provide in connection with the cross slide in a lathe or like machine, such as a screen machine or the like, for an adjustable stop that will arrest the cross motion at a predetermined point and automatically throw out the clutch mechanism by means of which the cross feed screw is operated. In this connection it is our object to provide a power transmission device of a character which will stay in meshed position for the entire desired motion of the cross slide, but will be thrown into neutral by mechanism operated by the slide itself when it comes up against the adjusted stop. In this connection further it is our object to provide for locating the clutch portion of the transmission on the high speed shaft thereof, with the object in view of facilitating the throwing of the cross slide operating mechanism into neutral.

It is our object to provide an improved clutch element, over the positive clutch means of the R. K. Le Blond and W. E. Groene Patent 1,218,784, issued by the United States Patent Office on March 13th, 1917. This we do by providing a toothed member of limited periphery together with a snap-switch type locating member.

We accomplish our object and attendant advantages to be noted by that certain construction and arrangement of parts of which a typical example will be hereinafter more specifically described, and the novelty inherent in which will be set forth in the appended claims.

In the drawings:

Figure 1 is a perspective view of a lathe equipped with our novel devices.

Figure 2 is a side elevation on a larger scale illustrating the operating lever and trip lever construction.

Figure 3 is a plan view of our novel clutch element.

Figure 4 is a vertical cross section taken through the apron and feed screw of the carriage, with the cross slide removed.

We have not illustrated an entire lathe, as the features of our invention are confined to mechanism borne on the carriage and operative of the cross slide thereon. We show a machine having a bed 1, and a carriage 2. At the front of the carriage is an apron 3, which in our preferred form of device carries the transmission mechanism to operate the cross slide. The cross slide is shown at 4 sliding on a dovetailed way 5 of the carriage. Mounted in the carriage is a cross feed screw 6. A hand wheel 7 may be mounted on the screw for operating it by hand.

As so far described the device is not different from the usual construction for the particular kind of machine illustrated.

The power shaft 8 which extends along the bed of the machine, parallel with the path of the carriage, provides the power for the cross feed screw. We have not shown the reversing connection except for the exterior handle 9, which, as is usual in reversing gears, slides one of two beveled pinions 10, (one being shown), that are keyed to slide on the shaft 8, into mesh with a beveled gear to be driven.

Mounted on a fixed spindle 11 held in the apron, is a dish shaped beveled gear 12, which meshes with the pinions 10. This spindle is held in the portion 3ª of the apron, and extends to the front of the apron. It carries a sleeve 13, which has an annular groove 14 at the forward end for operating it, and at the end near the gear 12 has a clutch member 15. The rear face of the gear 12 has an annular gear toothed rib 16, and the clutch member 15 is formed with radial teeth 17, that will mesh with the teeth on the part 16. The clutch member 12 is of strictly limited periphery having the form of two opposed segments that bear the teeth 17, with a relatively narrow connecting web. This form of gear is simpler to form and cut, and operates as effectively as a full gear.

The sleeve 13 has formed on its main body the longitudinal teeth 13ª, which mesh with a large gear 18, that is held in place in the apron and drives the feed screw by means of a gear 19 (shown in dotted lines), that meshes with teeth 20 formed on the feed screw.

Aside from the clutch device there is nothing novel in the transmission to the cross feed screw, and we have merely indicated a portion of the drive.

Mounted in a housing 21 in the apron, that is formed for this purpose, is a shaft 22, which is reduced in cross section within the housing, and has a finger 23 thereon which lies in the annular groove 14, in the sleeve 13. By the rocking of this shaft the sleeve is moved lengthwise, resulting in throwing into mesh the clutch device, or moving it out of mesh.

The shaft 22 has a tapered pin 24 therein, and located in a boss 21ª of the housing is a hollow tapered pin 25, which lies in the path of the pin 24. This pin 25 has a spring 26 within it, and the hole in the boss is closed with a plug 27 against which the spring bears. The result of this construction is that as the shaft 22 is rocked, the pin 25 is forced down by the pin 24, until the apex of the latter passes over the apex of the former. The pin 25 will then rise under influence of its spring, and assist in throwing the sleeve to either position, dependent upon the motion imparted to the shaft 22, and will then hold the sleeve in whichever position it has been moved until enough force is applied to move the pin 24 across to the other side again. This type of mechanism could be replaced by any other snap switch type of locating and motion assisting device.

Due to the positive action of the clutch, whereby a short and definite movement will entirely disconnect the driving force, the extent of movement and required force to apply it will not make great demands upon the automatic stopping device now to be described. However, the fixed pin and spring pin device will hold the clutch in meshed position until some external force moves it away from said position, and will provide a quick "make" and "break" of the clutch. It will be noted that the clutch is applied to the high speed element 13ª of the cross feed drive. It should be noted, in this connection, that the teeth of the two clutch members are properly tapered to permit of easy movement into and out of mesh.

In order to operate the shaft 22, there is mounted upon it an operating handle 28, which has a collar engaging over the shaft 22. Pushing up on the handle (in the mechanism shown) throws the sleeve into position of causing mesh of the clutch members. The handle has a lug 29 thereon to which is pivotally secured one end of a link 30, that is fulcrumed on a trip lever 31 pivoted near the upper portion of the apron.

The lever at its upper end is provided with a V-shaped lug 32, which lies in the path of a V-shaped lug 33. The latter lug is formed on a bar 34, that is adjustably bolted to the cross slide by bolts 35.

When the lever handle 28 is pushed up, and the cross slide starts to feed across the carriage, the bar and tooth or lug 33 moves along with the cross slide until lugs 32 and 33 meet. Lug 33 then pushes down lug 32, and rocks the handle 28 into its position of disconnecting the clutch. This results in rocking the shaft 22 to bring the snap pin structure into position where the combined motion of the handle and the pins will suddenly throw the clutch entirely out of mesh and stop the driving of the cross slide. This extra throw pulls the trip lever well down so that it brings the lug 32 past the crest of lug 33. Should the operator decide to have the slide feed further by power, he can push up the control handle again, and is free to feed by hand, when the clutch is disengaged. The connections of the link 30 with the levers 31 and 28 will be loose enough to permit the two teeth to pass each other upon tripping.

The stop bar 34 may take the form of a multiple dog bar for accomplishing a multiple automatic cross stop for gaging several diameters on a piece of work, as will be obvious without illustration.

Having thus described a typical example of our invention, what we claim as new therein and desire to secure by Letters Patent, is:—

1. In combination, a bed, a power or high speed shaft, a carriage moving along said bed, a cross slide on the carriage, a clutch for engaging the shaft, transmission including reduction gearing from the clutch to the cross slide, means for operating said clutch manually, means for opening the clutch automatically, said last named means borne on the carriage, and means on the cross slide to engage said operating means, said two last noted means being arranged to pass each other after opening the clutch, so as to permit further manual operation.

2. In a machine tool, a carriage, a cross slide thereon, means for driving the cross slide, said means having a clutch and an operating handle therefor, a trip lever on the carriage connected to the handle, said connection comprising a link connected from the lever to the said operating handle, and a tapered abutment on the link and a like abutment on the cross slide adapted to contact therewith, the latter abutment being adjustable, and said abutments arranged to pass each other upon tripping.

3. In a machine tool, a carriage, a cross slide movable thereon, a clutch and driving means for the cross slide borne by the carriage, said clutch being a positive engagement type, and a controller for the clutch having spring means to throw it to its limit of movement when past center, and means on the carriage and on the cross slide to contact with each other, the means on the carriage being movable and connected to said controller in order to throw the controller past center causing it to open the clutch.

WILLIAM O. STRAUSS.
WILLIAM E. GROENE.